United States Patent [19]

Hase et al.

[11] Patent Number: 5,122,423
[45] Date of Patent: Jun. 16, 1992

[54] MAGNETIC RECORDING MEDIUM COMPRISING A CHROMIUM UNDERLAYER DEPOSITED DIRECTLY ON AN ELECTROLYTIC ABRASIVE POLISHED HIGH PURITY ALUMINUM ALLOY SUBSTRATE

[75] Inventors: Takashi Hase; Hiromi Matsumura; Yoshihiko Onishi; Hidetaka Hayashi, all of Kobe; Motoharu Sato, Mohka, all of Japan

[73] Assignee: Kabushiki Kaisha Kobe Seiko Sho, Kobe, Japan

[21] Appl. No.: 326,641

[22] Filed: Mar. 21, 1989

[30] Foreign Application Priority Data

Aug. 15, 1988 [JP] Japan .................. 63-202978

[51] Int. Cl.⁵ .................................. G11B 5/00
[52] U.S. Cl. ...................... 428/694; 428/900; 428/64

[58] Field of Search ............ 428/694, 900, 64, 65

[56] References Cited

U.S. PATENT DOCUMENTS

| | | | |
|---|---|---|---|
| 4,152,487 | 5/1979 | Yanagisawa | 428/621 |
| 4,431,461 | 2/1984 | Hoshino et al. | 148/2 |
| 4,839,005 | 6/1989 | Katsumoto et al. | 204/129.46 |

*Primary Examiner*—Merrell C. Cashion, Jr.
*Assistant Examiner*—Stevan A. Resan
*Attorney, Agent, or Firm*—Oblon, Spivak, McClelland, Maier & Neustadt

[57] ABSTRACT

Magnetic recording media, wherein a substrate of Al-Mg alloy prepared from aluminum metal at a purity of higher than 99.99% is surface finished by electrolytic abrasive polishing and a thin film layer of ferromagnetic material is formed thereover as a recording layer.

The Al-Mg alloy is preferably prepared by rapid-cooling solidification.

1 Claim, 8 Drawing Sheets

MAGNETIC RECORDING MEDIUM COMPRISING A CHROMIUM UNDERLAYER DEPOSITED DIRECTLY ON AN ELECTROLYTIC ABRASIVE POLISHED HIGH PURITY ALUMINUM ALLOY SUBSTRATE

BACKGROUND OF THE INVENTION

1. Field of the Invention

The present invention relates magnetic recording media used for the storage of data information. It relates more particularly to thin film magnetic recording media using aluminum alloy disk substrate.

2. Description of the Prior Art

As the typical examples of such media in the prior art, there can be mentioned those disclosed in Japanese Patent Publication Sho 48-18842 and Japanese Patent Laid-open Applications Sho 58-51024 and Sho 60-261022.

FIGS. 10(a), (b) and (c) show, respectively, layered structures of typical magnetic disks put to practical use in the prior art. Layers of ferromagnetic metal or oxide are formed on a substrate of non-magnetic Al-Mg alloy by means of electroless plating or sputtering. FIG. 10(a) shows a plated disk prepared by forming a Ni-P undercoat (2) on a substrate (1) of Al-Mg alloy by means of electroless plating to a thickness of from 10 to 30 μm for improving the precious fabricability at the surface of the substrate, which is then finished into a smooth surface and a magnetic layer (3) on which magnetic information is actually recorded is formed from ferromagnetic material of Ni-Co-P alloy by plating on the thus finished substrate. Then a surface protective layer (4) such as of $SiO_2$ is further formed. Values for the thickness of respective layers are shown for the reference in the brackets.

FIG. 10(b), shows a structure in which a ferromagnetic Ni-Co alloy material is formed by sputtering on a substrate with a Ni-P undercoat (2) thereby form a magnetic layer (3'). A Cr underlayer (5) is formed between the magnetic layer (3') and the Ni-P undercoat (2), while a protective carbon layer (4') is formed at the surface. FIG. 10(c) shows a structure in which an $Al_2O_3$ layer (2') is formed instead of the Ni-P undercoat on a substrate (1) by using alumite process and a magnetic layer (3'') made of ferromagnetic $\gamma$-$Fe_2O_3$ material is formed thereover.

In the magnetic recording media of this type, since the thickness of each of the magnetic layers (3), (3') and (3'') is thin, adhesion thereof with the substrate or the hardness of the substrate restricts the abrasion resistance. In order to provide magnetic recording media with various characteristics, it is at first required that the substrate can satisfy the following conditions, that is, (I) has high degree of surface finish (surface roughness Ra<0.01 μm), (II) has no such head hit protrusions at all as hindering the stable flying of a magnetic transdusing head, (III) has little defects which may cause signal errors or no such defects at all, and (IV) has a sufficient hardness not to suffer from deformation damages upon contact-start-stop with the head.

For the required characteristic (IV), since the surface protective layer (4) or a lubricant layer also has a close relation therewith, actual conditions only with respect to the substrate are not clear. However, for other required characteristics, since the thickness of the magnetic layer has to be reduced in view of the information recording density, the drawback or the incomplete nature of the substrate can not be compensated by the upper layers.

In order to cope with such problems, substrates prepared by applying the Ni-P undercoat (2) to a thickness of 10-30 μm by means of electroless plating or applying the $Al_2O_3$ layer (2') on a non-magnetic substrate made of Al-Mg alloy and subsequently applying surface finishing by means of polishing has been used, and a magnetic layer is formed further thereover in the prior art. That is, the magnetic layer has not been formed directly on the surface of the substrate (1) of Al-Mg alloy in the prior art. Such direct formation can not be put to practical use, because there has been known no appropriate method for making the surface of the Al-Mg alloy substrate free from protrusions in the prior art and because a lot of intermetallic compounds such as Al-Fe and Mg-Si are present at the surface of the Al-Mg alloy substrate, which deteriorate the characteristics of the magnetic layer (3) in view of various points.

However, the Ni-P undercoat (2) or $Al_2O_3$ layer (2') is not necessary in the magnetic recording and additional formation of such layer increases the cost of the magnetic recording media. Particularly, since Ni is generally expensive material, it results in a further increase in the cost.

SUMMARY OF THE INVENTION

It is, accordingly, an object of the present invention to overcome the foregoing problems in the prior art and provide satisfactory magnetic recording media by improving the characteristic of the substrate of aluminum-magnesium alloy per se, to provide a substrate capable of satisfying all of required characteristics by merely applying electrolytic abrasive polishing to the substrate, thereby enabling to form a thin ferromagnetic layer directly with no requirement of forming a Ni-P undercoat, etc. on the substrate.

The foregoing object can be attained by magnetic recording media according to the present invention, wherein a disk of Al-Mg alloy prepared from aluminum metal at a purity higher than 99.99% is applied with electrolytic abrasive polishing into a substrate and a thin film layer of ferromagnetic material is formed thereover as a recording layer.

Since the present invention can be practiced with further advantage by using rapid-cooling solidification in the production of the aluminum-magnesium alloy, the present invention also provides a magnetic recording media, wherein a disk of Al-Mg alloy prepared by rapid-cooling solidification from aluminum metal at a purity higher than 99.9% is applied with electrolytic abrasive polishing into a substrate and a thin film layer of ferromagnetic material is formed thereover as a recording layer.

In the case of using a Co alloy as the ferromagnetic material, it is advantageous to apply a underlayer such as of Cr on an aluminum-magnesium alloy substrate in order to improve the magnetic characteristic of the Co alloy. A protective layer is then formed on the magnetic layer.

In addition, an intermediate layer may be formed on the magnetic layer to improve the adhesion to the protective layer formed thereover.

In the present invention, since a substrate of the aluminum-magnesium alloy is prepared by using aluminum metal at a purity of higher than 99.9%, the size and number of intermetallic compound are reduced. Then, by flattening the surface by electrolytic abrasive polishing, the surface is free from spikes or other sharp discontinuities caused by diamond turning or by polishing. Accordingly, required characteristics as the substrate can be satisfied and, by applying sputtering or plating to the thus fabricated substrate to form a recording layer made of ferromagnetic material such as Co alloy, $\gamma$-$Fe_2O_3$, etc. defects in the recording layer can be reduced, to reduce the frequency for the occurrence of signal errors (bit errors) and decrease the bit length of the signal errors upon recording and/or reproducing.

In addition, when the substrate of the aluminum-magnesium alloy is prepared by rapid-cooling solidification, the intermetallic compounds are decreased even for the identical alloy composition and the number of signal errors and the bit length can further be reduced.

Among various types of electrolytic abrasive polishing, those electrolytic abrasive polishing techniques as described in Japanese Patent Laid-open No. Sho 62-94224 (U.S. patent application Ser. No. 187,464) can provide satisfactory result.

In the electrolytic abrasive polishing, since passive oxide layers are formed on the surface of a substrate by using a passivating electrolyte solution such as of sodium nitrate at a concentration of 10% or lower, only the protruded portions of the oxide layer are selectively removed by frictional rubbing with an alumina powder with an average grain size of not more than 1.0 $\mu$m and electrolysis is applied concentrically to those portions, thereby efficiently leaching out only the protruded portions to obtain mirror-finished surface, ultra-flat mirror-surface more excellent in the flatness than in the case of applying abrasive fabrication or electrolytic polishing alone can be obtained, by which the dimensional accuracy can be maintained with no denatured layers caused by mechanical fabrication.

BRIEF DESCRIPTION OF THE ACCOMPANYING DRAWINGS

These and other objects, as well as advantageous features of the present invention will become more apparent by reading the descriptions for the preferred embodiments of the present invention in conjuntion with the appended claims, wherein FIG. 1 is a flow chart showing the production sequence for magnetic recording media as the first example according to the present invention;

FIG. 5 is a chart showing the relationship between the number of head contact and the number of surfaces in which.

Figure 9:
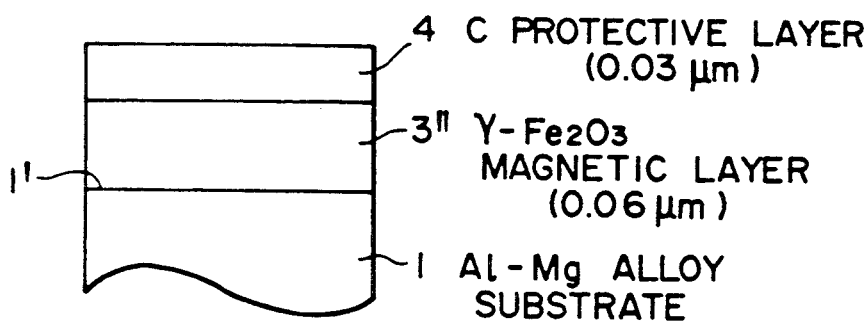
Figure 10A:
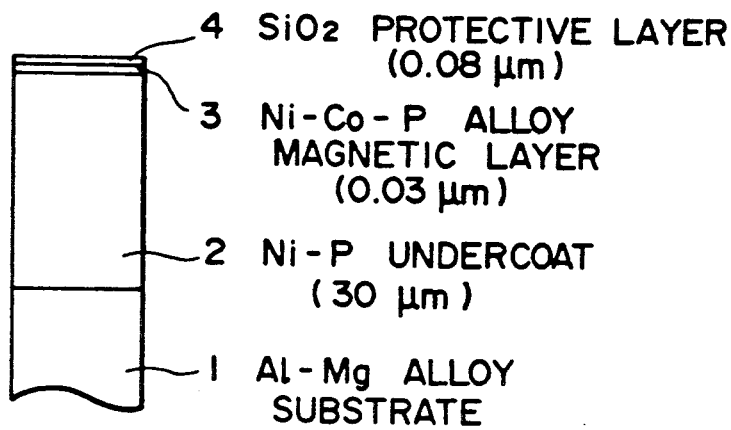
Figure 10B:
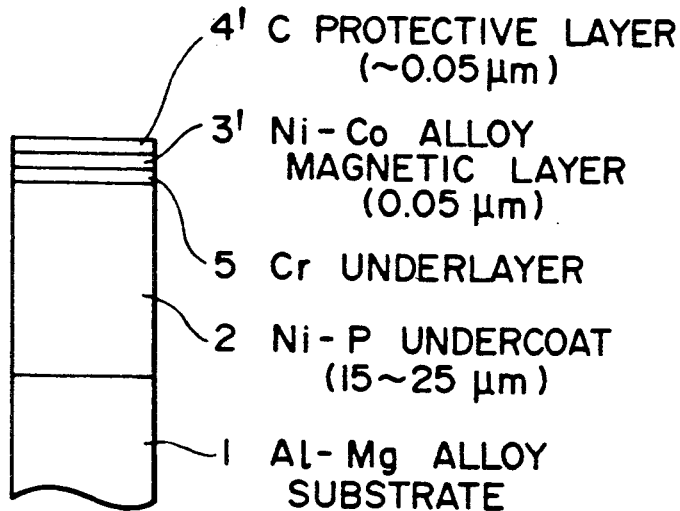
Figure 10C:
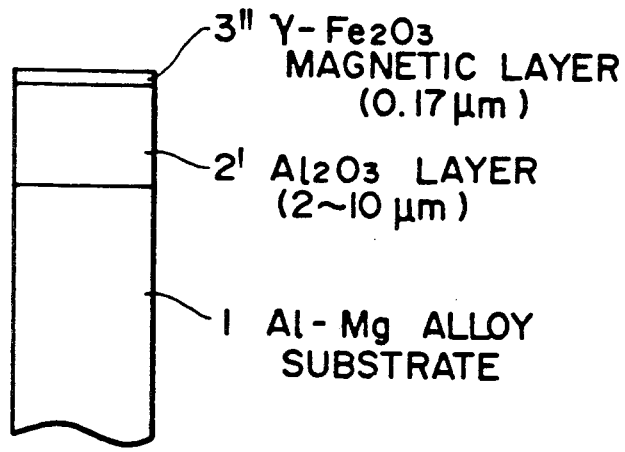

FIG. 9 is a cross-sectional view of the layered structure in the fifth example of the magnetic recording media according to the present invention; and FIG. 10(a) is a cross-sectional view of the layered structure for one embodiment of the magnetic recording media in the prior art, FIG. 10(b) is a cross-sectional view of the layered structure of another embodiment thereof, and FIG. 10(c) is a cross-sectional view of the layered structure of a further embodiment thereof.

DESCRIPTION OF THE PREFERRED EMBODIMENTS

EXAMPLE

Figure 1:
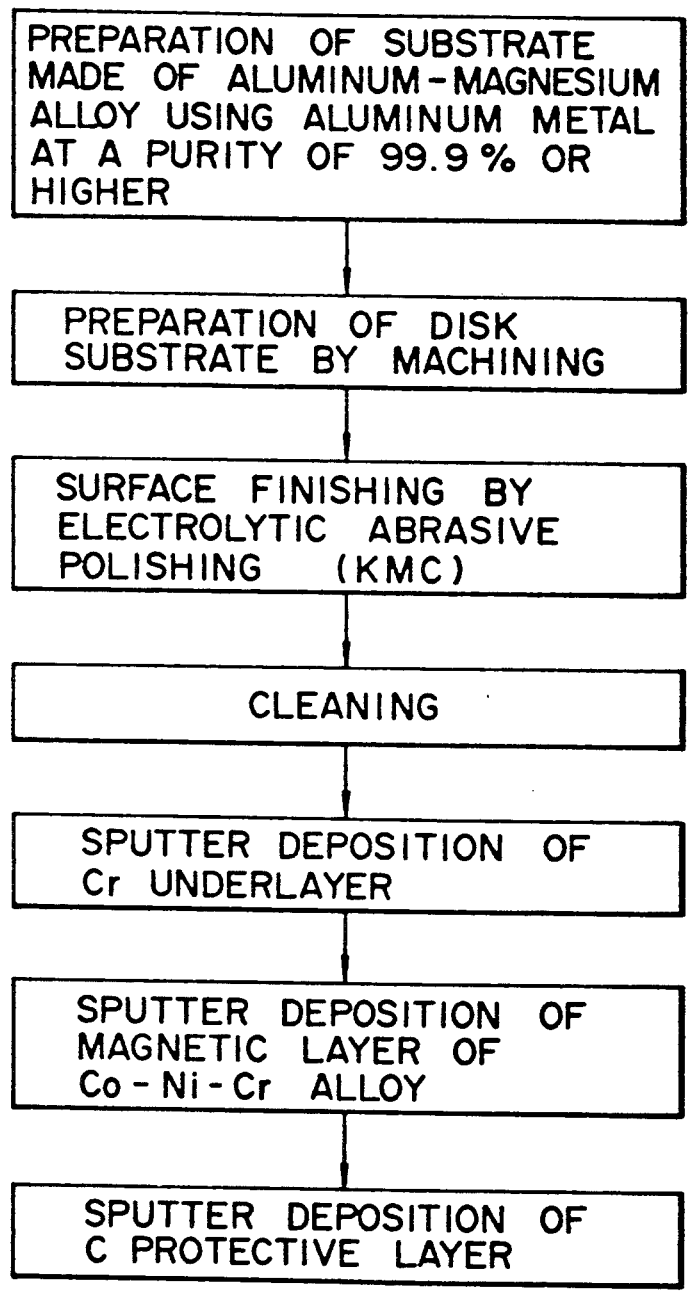
Figure 2:
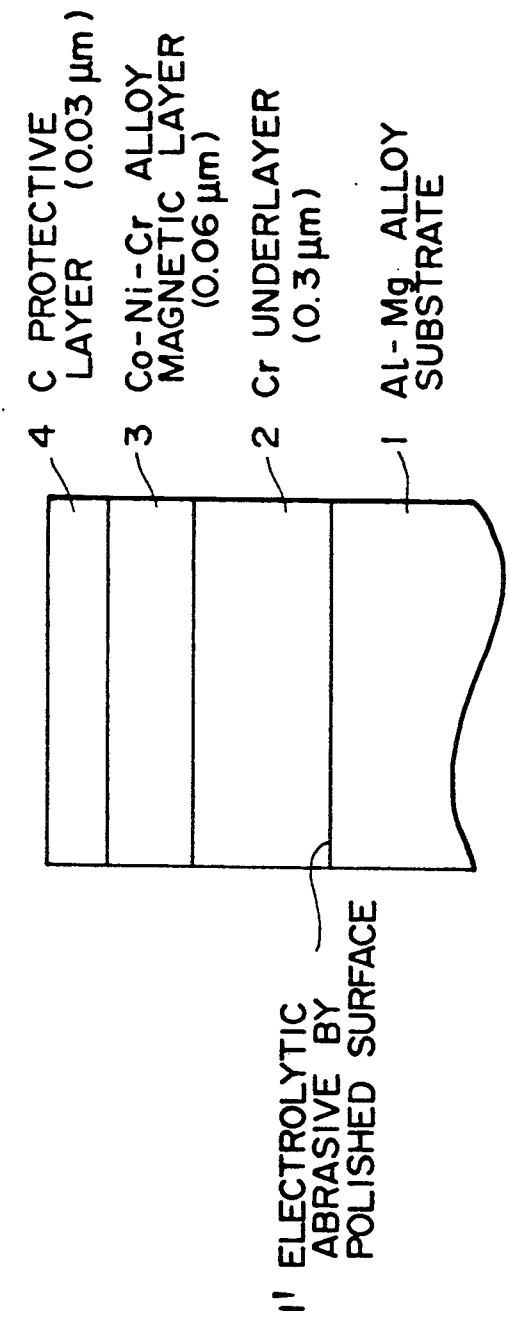
FIG. 2 is a cross-sectional view of the layered structure of the magnetic recording media in the present invention.

FIG. 1 shows one example for the production sequence of the magnetic recording media according to the present invention and FIG. 2 shows one example of the layered structure of the magnetic recording media according to the present invention, in which a Cr underlayer and a magnetic layer of Co-Ni-Cr alloy are sputter deposited at $3 \times 10^{-3}$ Torr in accordance with the production sequence. A Cr underlayer (2) is sputter deposited onto the surface (1') of a substrate (1) made of aluminum-magnesium alloy applied with electrolytic abrasive polishing, and a magnetic layer (3) of ferromagnetic Co-Ni-Cr alloy is then sputter deposited onto the Cr underlayer (2). The Cr underlayer (2) is an intermediate layer for improving the magnetic properties of the Co-Ni-Cr layer, and is not an essential constituent in the magnetic recording media according to the present invention. A protective carbon layer (4) is then sputter deposited onto the magnetic layer (3). For the reference, values for the thickness of the respective layers are shown in the brackets.

Figure 3:
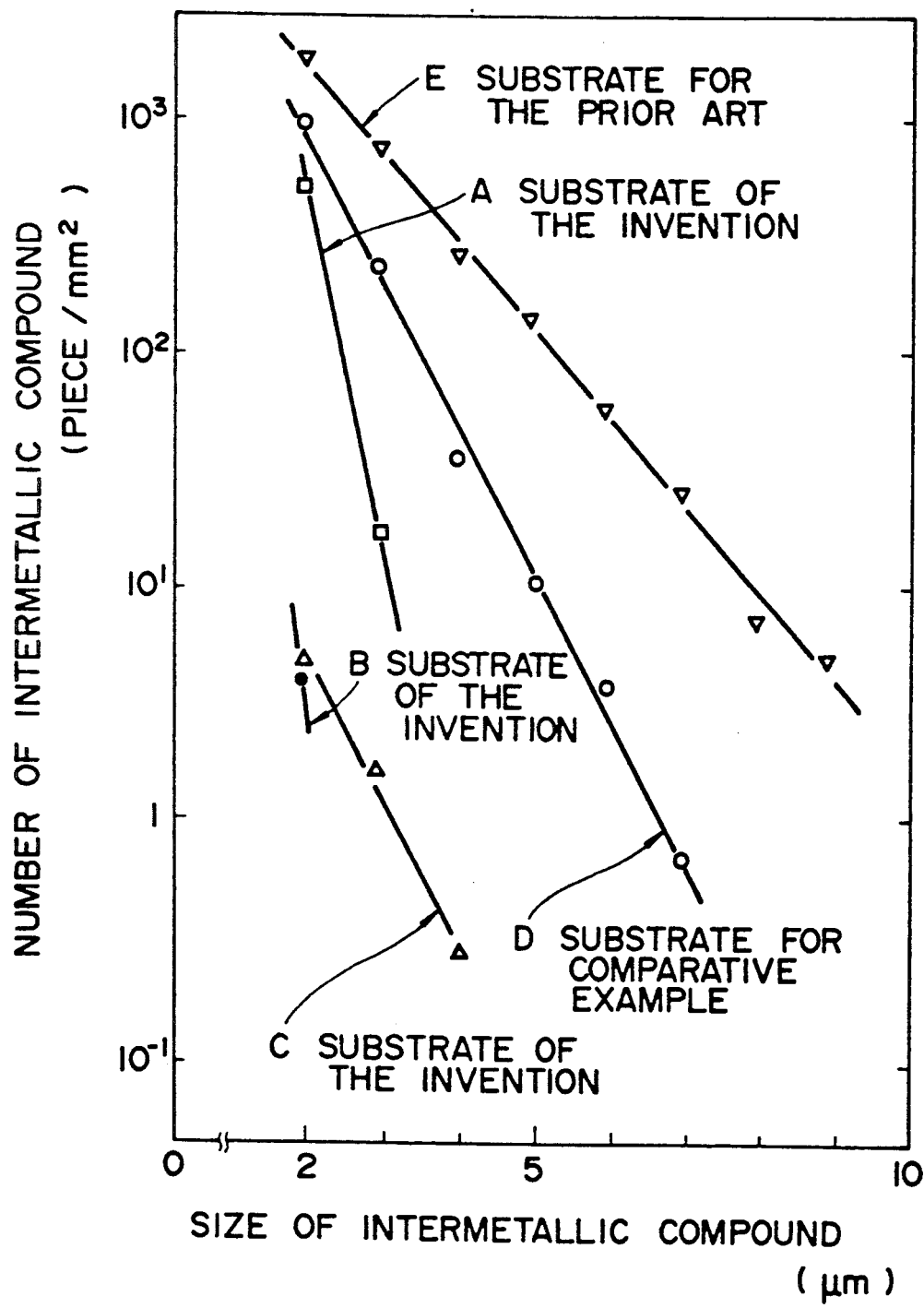
FIG. 3 is a chart showing the size distribution of the intermetallic compounds on the substrate of an aluminum-magnesium alloy as a relationship between the size and the number thereof in comparison with the examples in the prior art and a comparative examples.

FIG. 3 shows a relationship between the size of the intermetallic compound ($\mu$m) indicated on the abscissa and the number (piece/mm$^2$) thereof indicated on the ordinate for the substrate made of aluminum-magnesium alloy prepared in accordance with the present invention. Aluminum metal at a purity of 99.9% was used for the specimen (A), aluminum metal at a purity of 99.99% was used for the specimens (B) and (C), and rapid-cooling solidification was used for (A) and (B), all of which are included within the scope of the present invention. Specimens (D) and (E) are for comparative examples.

The comparative specimen (D) was prepared from aluminum metal at a purity of 99.9% without relied on rapid-cooling solidification and the comparative specimen (E) was prepared from aluminum metal at a purity of 99.5% corresponding to the conventional JIS standard. It can be seen from the foregoings that the sizes and numbers of intermetallic compounds in the specimens (A), (B) and (C) are remarkably smaller than those in the specimens (D) and (E).

Figure 4:
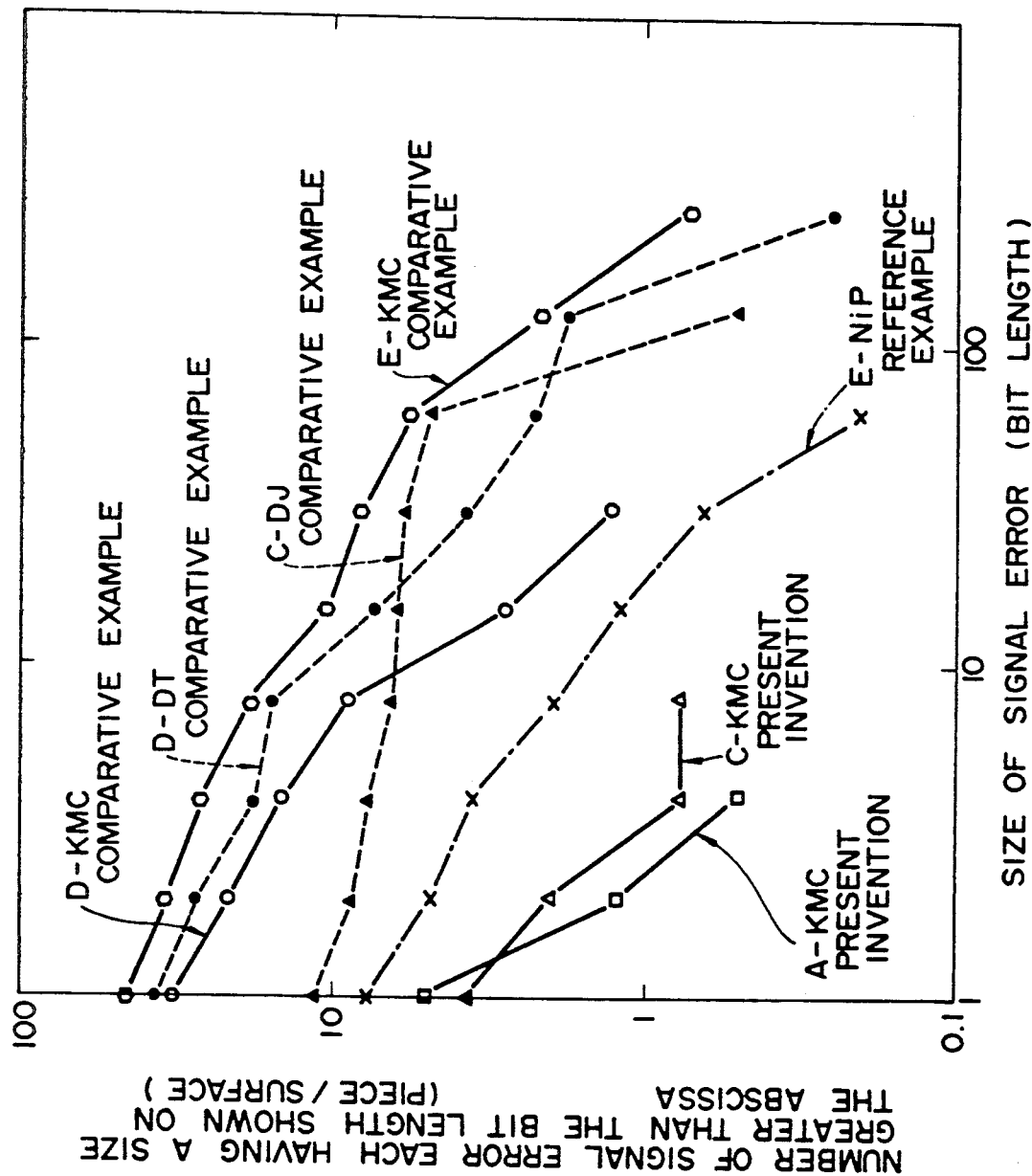
FIG. 4 is a chart showing the relationship between the size of errors and the number of errors in comparison with reference examples and comparative examples.

FIG. 4 is a chart for comparing the media specimens using the substrates made of aluminum-magnesium alloy as described above. A-KMC and C-KMC are within the range of the present invention, in which the substrate of alloy (A) and (C), respectively, are surface finished by electrolytic abrasive polishing (KMC). C-DT and D-DT, in which the substrates are surface finished by diamond turning (DT), are comparative examples. D-KMC and E-KMC are also comparative examples. In the drawing, the abscissa shows the size of signal error (bit length) of the media specimens prepared on each substrate and the ordinate shows the number of signal error (piece/surface) each having a size greater than the bit length shown on the abscissa. The disk has a diameter of 5.25 inch and 76.7 cm² of recording region per one surface, and the values are average values for four surfaces. The specimen E-NiP is a reference example in which a conventional substrate with Ni-P undercoat is used as in the prior art.

The superiority of the substrates according to the present invention can apparently be observed from FIG. 4.

Figure 5C:
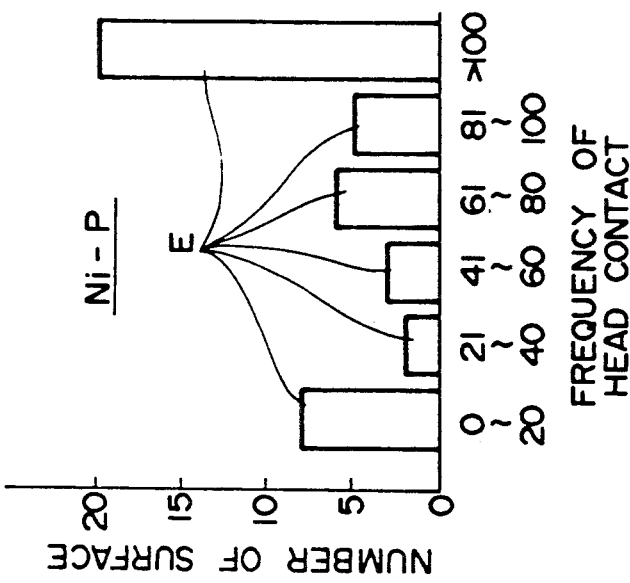
FIG. 5(c) is a chart in the case of the prior art in which a Ni-P underlayer is contained as a comparison.
Figure 5B:
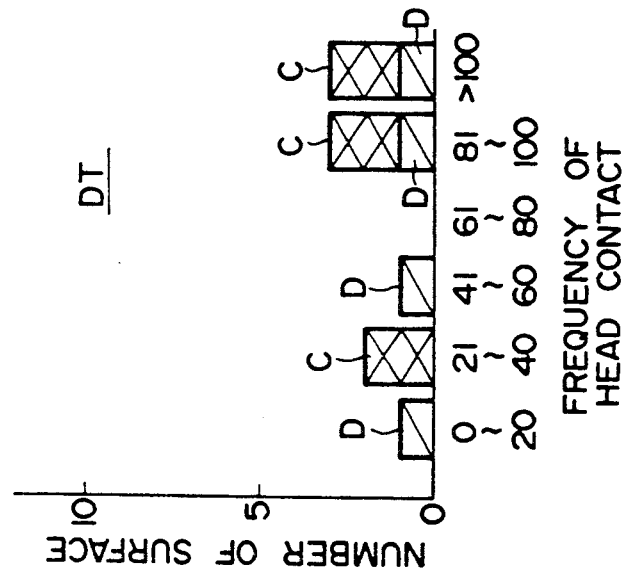
FIG. 5(b) is a chart showing the case of applying diamond turning as a comparison.
Figure 5A:
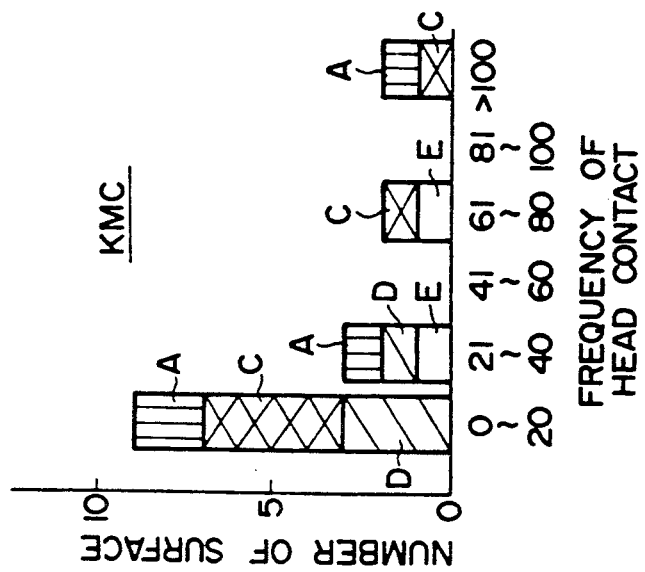
FIG. 5(a) is a chart showing the case of applying electrolytic abrasive polishing.

FIG. 5 shows a comparison for the frequency of head contact under a varnish glide test shown on the abscissa and the number of the surface having such frequency of head contact shown on the ordinate with respect to each of the media specimens on the substrate shown in FIG. 3. FIG. 5(a) shows a case of media on substrate finished by electrolytic abrasive polishing (KMC), in which the specimen (A) and (C) is within the range of the present invention, while the specimens (D) and (E) are comparative examples. FIG. 5(b) shows the case of media on substrate finished by diamond turning and FIG. 5(c) shows the case of media on substrate with Ni-P underlayer, both of which are out of the scope of the present invention.

It can be seen also from FIG. 5 that the number of surfaces for the frequency of head contact is lesser in the present invention.

Based on the results of the foregoing and other tests, characteristics of the magnetic recording media according to the present invention are collectively summarized as described below in comparison with those in the prior art in which substrates with Ni-P undercoat were used:

(1) Number of Error:

More satisfactory than those in the prior art (refer to FIG. 4), (2) Durability:

Able to withstand contact-start-stop operation over 20,000 cycles, (3) Head Contact:

More satisfactory than in the prior art (refer to FIG. 5), (4) Static Magnetic Characteristics:

Comparable with the prior art, regarding coercive force (Hc), residual magnetization (Br) and squareness (S), (5) Recording/Reproducing Characteristics:

Comparable with the prior art both in 2FTAA and $D_{50}$.

In addition to the layered structure of the foregoing embodiment shown in FIG. 2, the magnetic recording media according to the present invention can be practiced in the form of applying various modifications to the layered structure.

Figure 6:
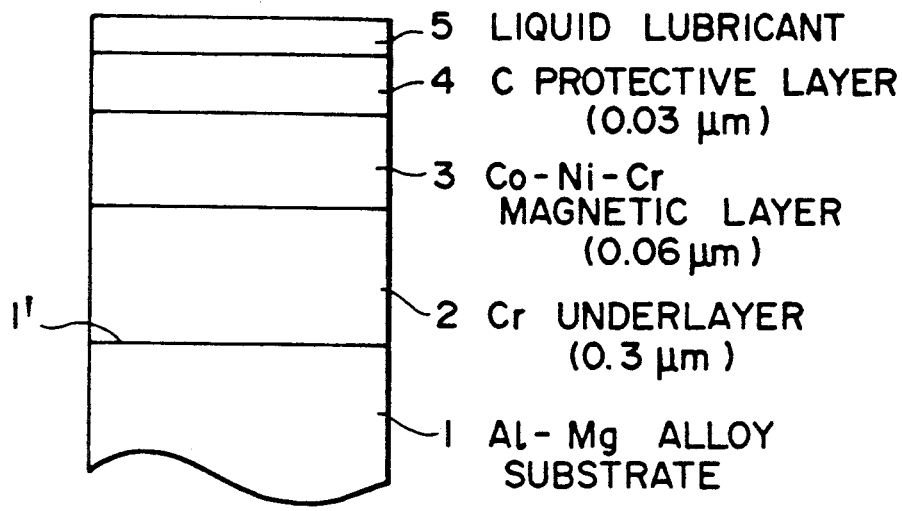
FIG. 6 is a cross-sectional view of the layered structure in the second example of the magnetic recording media according to the present invention.

FIG. 6 shows an example in which a liquid lubricant (5) is spin-coated on the C protective layer (4) in the layered structure shown in FIG. 2. The media can withstand CSS operation over 20,000 cycles, even combined with a hard head slider such as of $Al_2O_3$. TiC of the thin film head.

Figure 7:
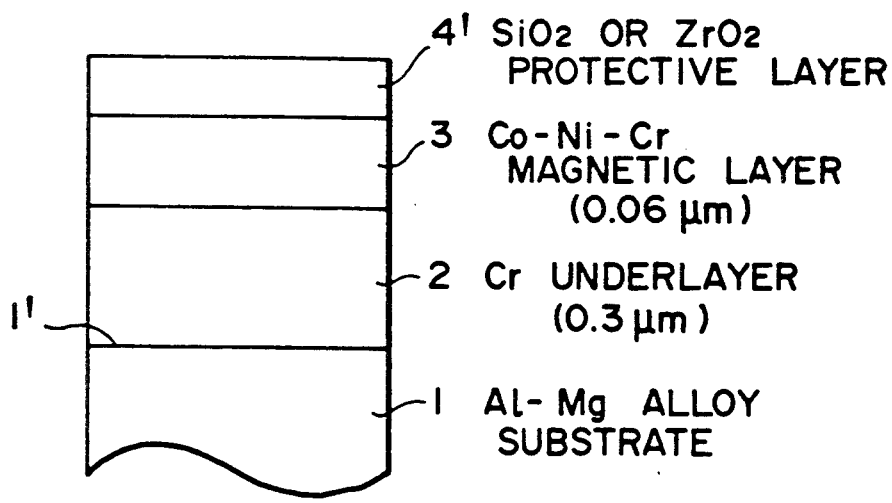
FIG. 7 is a cross-sectional view of the layered structure in the third example of the magnetic recording media according to the present invention.

FIG. 7 shows an embodiment in which an oxide protective layer (4') such as of $SiO_2$, $ZrO_2$, etc. is formed instead of the C protective layer (4) in the layered structure of FIG. 2, and it has the characteristics identical with those of the example shown in FIG. 2.

Figure 8:
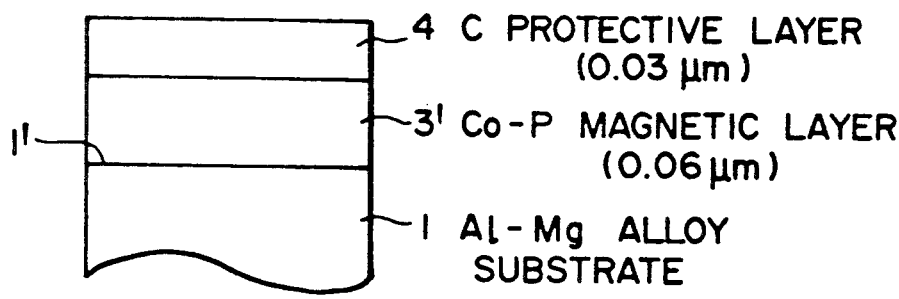
FIG. 8 is a cross-sectional view of the layered structure in the fourth example of the magnetic recording media according to the present invention.

FIG. 8 shows an example in which a Co-P magnetic layer (3') is formed by means of plating instead of forming the magnetic layer (3) including the Cr underlayer (2) in the layered structure in FIG. 2 by sputtering.

FIG. 9 shows an embodiment in which a magnetic layer (3") of $\gamma$-$Fe_2O_3$ which has been considered difficult to have satisfactory characteristics on the substrate with the Ni-P undercoat in the prior art has the equivalent characteristics with those of the example shown in FIG. 2.

As has been described above, it is possible to remarkably reduce the size and number of the intermetalic compounds on the surface of a substrate of aluminum-magnesium alloy according to the present invention and provide a substrate free from the grain boundery streaks or polishing scratches on the mirror face finished by the electrolytic abrasive polishing for flatening the surface. As a result, it is possible to obtain magnetic recording media with remarkably reduced defects in view of the recording characteristics and with less occurrence of signal errors (bit errors) upon recording/reproducing. In addition, no difficulty is caused in the production step, the number of steps can be decreased and products of satisfactory quality can be mass-produced.

What is claimed is:

1. Magnetic recording media made by the steps comprising: forming a substrate of Al-Mg alloy from aluminum metal of purity higher than 99.99%, surface finishing said substrate by electrolytic abrasive polishing whereby the surface roughness is less than 0.01 μm, forming an underlayer of Cr directly on the substrate which improves the magnetic characteristics of a thin film of ferromagnetic material, then forming a thin film of ferromagnetic material over said underlayer.

* * * * *